(12) United States Patent
Cairney (10) Patent No.: US 10,992,716 B1
(45) Date of Patent: Apr. 27, 2021

(54) IDENTITY MANAGEMENT PROTOCOL ROUTER

(71) Applicant: SailPoint Technologies, Inc., Wilmington, DE (US)

(72) Inventor: Christian Lee Cairney, Lancashire (GB)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

(21) Appl. No.: 16/925,162

(22) Filed: Jul. 9, 2020

(51) Int. Cl.
*H04L 29/06* (2006.01)
*H04L 29/08* (2006.01)

(52) U.S. Cl.
CPC ............ *H04L 63/20* (2013.01); *H04L 63/102* (2013.01); *H04L 63/107* (2013.01); *H04L 67/02* (2013.01)

(58) Field of Classification Search
CPC ......... H04L 41/0893; H04L 63/10–104; H04L 63/107; H04L 63/20–205; H04L 67/02
See application file for complete search history.

(56) References Cited

U.S. PATENT DOCUMENTS

| 2008/0109870 A1* | 5/2008 | Sherlock | G06F 21/552 726/1 |
| 2018/0041491 A1* | 2/2018 | Gupta | H04L 63/10 |
| 2019/0261169 A1* | 8/2019 | Kamal | H04W 12/02 |

\* cited by examiner

*Primary Examiner* — Kevin Bechtel
(74) *Attorney, Agent, or Firm* — Sprinkle IP Law Group (57) ABSTRACT

Systems and methods for an identity management router to allow application clients/servers to communicate via an identity management protocol to facilitate communication of identity management artifacts with a simplified topology. Specifically, embodiments of an IM router may adhere to various data protection requirements, including, but not limited to, local data protection regulations, when routing identity management information. The identity management router is location aware and applies data compliance policies for areas of data compliance to selectively route or not route identity management data based on location.

24 Claims, 5 Drawing Sheets

IDENTITY MANAGEMENT PROTOCOL ROUTER

TECHNICAL FIELD

Various embodiments of the present technology relate to network security. More particularly, some embodiments of the present technology relate to systems and methods for an identity management protocol router. Even more particularly, some embodiments relate to systems and methods for an identity management protocol router that provides for sharing of data between separate independent identity management endpoints.

BACKGROUND

Many enterprises are turning to cloud-based applications to provide geographically distributed users using a variety of devices with access to the applications and data of the enterprise. While cloud-based applications provide the convenience of wide accessibility, this accessibility leads to a number of security concerns, not the least of which is compliance with data protection compliance. Large enterprises are often made up of geographically dispersed organizations and sub-organizations and the data of an enterprise may be subject to various data protection regulations and other data protection requirements based on where the data is maintained, where the data is used, and/or the content of the data. For example, identity management data about citizens of the European Union (EU) is subject to the General Data Protection Regulations (GDPR) of the EU and may also be subject to additional regulation when the data is stored or used outside of the EU. Whereas identity management data about non-EU citizens used and stored outside of the EU may be free from the GDPR.

Identity Management (IM), also known as Identity and Access Management (IAM) or Identity Governance (IG), is the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management.

A number of IM protocols (also referred to IAM protocols) designed specifically for the transfer of identity management data have been developed. The SCIM (System for Cross-Domain Identity Management) protocol specified by Internet Engineering Task Force (IETF), for example, is an HTTP-based protocol that makes managing identities in multi-domain scenarios easier to support via a standardized service application-level protocol. The SCIM specification provides an open API for managing identity management data.

In current SCIM technologies, SCIM providers and SCIM consumers communicate point-to-point. The SCIM protocol does not encapsulate filtering of identity management data based on a per user basis or per the user's current location. This combined with the point-to-point nature of SCIM makes it challenging to manage and filter personal information (PI) data to satisfy local data protection requirements and ensure compliance with data protection regulations, such as the GDPR. Moreover, the point-to-point nature of current SCIM technologies results in complicated topologies when more than two SCIM endpoints are used to share information. These topologies can be difficult to manage. For example, because security is based on access rights to the SCIM endpoint (if available), the point-to-point nature of SCIM leads to complicated access rights which have to be re-engineered for each endpoint added to the topology.

Other aspects of a network environment may also limit the scalability of SCIM technologies. For example, if an endpoint is behind a firewall and needs access to other endpoints outside of the firewall, the firewall must be configured to allow the endpoint to connect with the other endpoints. In a point-to-point topology, this may require individual rules for each endpoint. As new endpoints are added, the firewall (and possibly other aspect's an enterprise network environment) may have to be reconfigured to allow connection to those endpoints.

SUMMARY

IM systems are designed to deliver the capability for the creation, ongoing management, display, and distribution of detailed and relevant contextual identity governance information for an enterprise. Increasingly, however, enterprises are moving functionality and sensitive data to the cloud platforms. Identity governance with respect to these cloud-based platforms utilized by an enterprise is challenging. Ensuring compliance with the complex web of data protection regulations and other data protection requirements to which the enterprise's data may be subject is a significant and ongoing issue for many enterprises.

Embodiments of the present technology provide an identity management (IM) router to allow application clients/servers to communicate via an identity management protocol, such as SCIM, to facilitate, for example, sharing of applications, accounts, identities, roles or other IM artifacts with a simplified topology that can adhere to various data protection requirements, including, but not limited to, data protection regulations. According to one aspect of the present disclosure, the solution implements a star topology (hub).

Embodiments of the present technology may include data compliance policies to provide filtering and data enforcement for clients. Embodiments may use access control and cache agents to accelerate the provisioning of identity management data while enforcing identity management data protection requirements. The IM router may cache identity management data according to configurable policies.

Some embodiments may support IM router chaining. IM router chaining can facilitate the caching and sharing of data in separate geographical regions. According to one embodiment, each IM router chain effectively becomes an identity management protocol client—for example, a SCIM client—and data enforcement is respected via the data compliance policies.

One embodiment includes an IM router comprising a memory configured to store a register of IM instances associated with areas of data compliance and a set of data compliance policies for the areas of data compliance, a processor, and a non-transitory, computer-readable storage medium. The non-transitory, computer-readable storage medium may include computer instructions for receiving and routing IM requests and identity management data. An IM request according to an IM protocol may be received. The IM request may be issued by an IM consumer for identity management data from an IM provider. The identity management data may be obtained, and a determination made whether to route the identity management data to the IM consumer.

Obtaining the identity management data may include the IM router routing the IM request to the IM provider and receiving the identity management data from the IM provider responsive to the IM request. In some embodiments, the IM router may maintain an identity management data cache—for example, an IM object cache, and even more particularly, a SCIM object cache in some embodiments. Obtaining the identity management data may include querying the cache for the requested identity management data. If the identity management data is available from the IM object cache, the IM router may obtain the identity management data from the cache. If the identity management data is not available from the cache, the IM router may obtain the IM data by routing the IM request to the IM provider and receiving the identity management data from the IM provider responsive to the IM request.

The determination of whether to route the identity management data to the IM consumer may include determining from the register a first area of data compliance associated with the IM consumer, accessing a data compliance policy for the first area of data compliance, and evaluating the data compliance policy for the first area of data compliance to determine whether the identity management data is permitted to be provisioned to the first area of data compliance. Based on a determination from evaluating the data compliance policy for the first area of data compliance that the identity management data is permitted to be provisioned, the IM router routes the identity management data to the IM consumer according to the IM protocol. On the other hand, based on a determination from evaluating the data compliance policy for the first area of data compliance that the identity management data is not permitted to be provisioned, the IM router does not route the identity management data to the IM consumer.

As discussed, the IM router may route identity management data to the IM consumer. Routing the identity management data to the IM consumer may comprise routing the identity management data directly to the IM consumer or routing the identity management data to the IM consumer through a chained IM router. In the later case, the IM router may route an IM request to a chained IM router for routing to the IM provider.

The IM router may enforce a data compliance policy associated with an area of data compliance. The data compliance policy for an area of data compliance may include provisioning permissions selected to enforce a set of local data protection requirements, such as local data protection regulations. In some cases, the IM provider and the IM consumer are in a same defined geographic region subject to, for example, a same set of local data protection requirements. The IM router may be configured to enforce the set of local data protection requirements for the region. In some embodiments, the data compliance policies enforced for routing data to IM consumers may be owned, managed, or otherwise associated with the IM providers. Thus, an IM provider can control how the IM router provisions the IM provider's identity management data to IM consumers.

The IM consumer and IM provider may be in different regions subject to different data protection requirements. For example, the IM consumer may be in a first region subject to a first set of local data protection requirements and the IM provider may be in a second region subject to a second set of local data protection requirements. An IM router in the first region may send the IM request to an IM router in the second region. Thus, for an IM router in the second region, receiving the IM request may comprise receiving the IM request from a chained IM router in the first region. Moreover, for the IM router in the second region, routing the identity management data to the IM consumer may comprise routing the identity management data to the chained IM router for routing to the IM consumer.

In some embodiments, the IM router is a SCIM router. For example, the IM router may allow communication between a plurality of IM instances using a SCIM protocol according to a simplified topology, such as a star topology.

Embodiments of the present technology can provide a number of advantages. For example, embodiments can reduce or remove the challenges of multiple point-to-point relationships by providing a topology that allows for simplification of access and controls via a network.

An identity management router can implement centralized data compliance policies to provide for across-the-board access to identity management data—for example, SCIM data. Further, an IM router can allow security controls to be implemented in a more business-friendly manner that, for example, aligns with how an enterprise geographically divides its operations.

An identity management router may cache identity management data. Caching of identity management data at the IM router reduces the overhead of provider scaling requirements.

Various embodiments may be implemented in an elastic non-blocking implementation to allow for fast scaling on demand.

Some embodiments may support router chaining. Router chaining allows for geographical caching and security controls to provide identity management data rapidly with lower latency while respecting data compliance in line with various data protection requirements, such as GDPR.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented identity management (IM) in association with their distributed networked computer environments.

IM solutions allow the definition of various IM artifacts for encapsulating identity management data. These artifacts may be associated and managed accordingly. In a SCIM-based implementation these artifacts may include artifacts of core resource types (e.g. User, Group) and artifacts according to extended resource types. Each resource type may define, for example, the name, endpoint, base schema (the attributes), and any schema extensions registered for use with the resource type. In order to offer new types of resources, a service provider defines the new resource type and provides the schema representation. Each IM artifact may be embodied as an IM object. In general, IM objects of various types may be defined, where each IM object type defines a set of attributes and has a schema for objects of that type. In a SCIM-based implementation, for example, each SCIM resource is an object (e.g., a JSON object) that has a resource type, a schemas attribute, and common attributes.

Examples of IM artifacts include, but are not limited to, applications, accounts, roles, entitlements, and identities. As mentioned above, these artifacts may be associated and managed accordingly. Accounts, for example, may represent accounts associated with cloud service providers or other providers. Applications may represent software applications or other resources available from cloud service providers or other providers. An identity may be almost any physical or virtual thing, place, person, or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with these examples of how these identity governance artifacts may be used, each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks, or network locations, etc. To facilitate the assignment of these entitlements, enterprises may also be provided with the ability to define roles or other IM artifacts within the context of their IM solution. A role within the context of identity management may be a collection of entitlements. These roles may be assigned names or identifiers (e.g., manager, engineer, team leader) by an enterprise that designate the type of user or identity that should be assigned such a role. By assigning a role to an identity in the identity management context, the identity may be assigned the corresponding collection of entitlements associated with the assigned role. Accordingly, by defining these roles enterprises may define a "gold standard" of what they desire their identity governance to look like.

Thus, an IM system may allow an administrative or other type of user to define one or more IM artifacts such as an account, application, identity, entitlement, role and associate these defined identity management artifacts using, for example, an administrator interface. For example, defined identities may be associated with entitlements or roles. The assignment may occur, for example, by directly assigning an entitlement to an identity, or by assigning a role to an identity whereby the collection of entitlements comprising the role are thus associated with the identity.

An IM topology may include a number of IM providers and IM consumers. An IM provider is an instance that provides IM artifacts from its instance to be consumed by an IM consumer. An IM consumer is an instance that can consume IM artifacts from an IM provider. In some cases, an instance may act as both an IM provider and an IM consumer. In a SCIM-based implementation, each IM provider may be a SCIM service provider that provides SCIM resources, where a SCIM resource is an artifact that is managed by a SCIM service provider and that contains one or more attributes. Even more particularly, each IM provider may be an instance of a web application that provides identity or identity related information via the SCIM protocol. Each IM consumer may be, for example, a SCIM client.

In current SCIM technologies, IM providers and IM consumers communicate according to a point-to-point model. As discussed above, a point-to-point topology can become complicated in design and administration as the number of endpoints grows. What is desired, therefore, are systems that allow IM providers and IM consumers to communicate via an IM protocol using a simplified topology that can adhere to data protection requirements.

To those ends, among others, attention is now directed to the systems and methods for an IM router disclosed herein. The IM router provides region aware data routing in compliance with various data protection requirements and, in particular, in compliance with the data protection regulations based on the location of the IM router, the location of the IM provider or the location of the IM consumer. For example, the IM router may be aware of the location from which identity management data is being provided and is able to enforce local laws and policies to ensure that data is protected while being transmitted.

According to one embodiment, each IM endpoint (IM provider and IM consumer) in a topology registers with and connects to the IM router. The IM providers and IM consumers may be at various domains and network addresses. Requests and responses between the endpoints are routed through the IM router. The IM router allows IM consumers and IM providers to communicate via an identity management protocol to facilitate, for example, sharing of IM artifacts, such as applications, accounts, identities roles, or other IM artifacts with a simplified topology and that can adhere to data protection requirements and regulatory compliancy. In various embodiments, access control and cache agents may be utilized to accelerate the provisioning of data while enforcing data protection requirements and regulations.

The IM router may be located outside of a firewall which an IM endpoint is behind, and the firewall rules can be configured to allow the IM endpoint to connect to the router. Because the endpoint connects to the router rather than point-to-point with the other endpoints in the topology, the burden of reconfiguring the firewall to accommodate new endpoints in the topology is substantially reduced, if not eliminated. Moreover, the IM router may incorporate various data compliance policies to ensure compliance with various data protection requirements and regulations. Access rights to IM endpoints can thus be managed at the IM router, simplifying administration when new endpoints are added to the topology.

An organization may define areas of data compliance, where each area of data compliance defines a logical data compliance boundary subject to associated data protection requirements. As data compliance requirements may vary by location based on local regulations, the areas of data compliance may correspond, in some embodiments, to geographic areas subject to local data protection requirements. For example, an enterprise's operations in a Europe, Middle East, Africa (EMEA) region may be subject to the GDPR, whereas the enterprise's operations in Russia may be subject to Russian data compliance regulations. In such an example, the organization may define an EMEA GDPR region for operations in the EU and a Russia region for operations in Russia. The enterprise may also define sub-regions, such as individual countries. In one embodiment, the areas of data compliance may include regions that correspond to the regions by which the enterprise uses to divide its operations by geography.

IM providers and IM routers in a region can be configured to connect to an IM router in the region. Preferably, the data compliance regions are defined such that IM providers in a region can provide identity management data, such as IM artifacts, to the IM router in compliance with the local data protection requirements of the region. In some cases, however, the IM providers and IM consumers in a region may be subject to additional regulations or other data protection requirements that do not allow an IM provider to provide identity management data to an IM consumer and thus do not allow the IM router to provide identity management data received from the IM provider to the IM consumer. To help ensure compliance with data protection requirements for intraregional routing, various areas of data compliance may be defined for locations within the region (e.g., a sub-region such as a country, a city, or other location defined at a level of granularity for which data compliance is desired). The IM router may enforce data compliance policies to ensure data compliance based on the areas of data compliance associated with IM providers or IM consumers.

IM routers may implement router chaining to facilitate the caching and sharing of identity management data in separate geographical regions. According to one embodiment, each IM router chain effectively becomes an identity management protocol client—for example, a SCIM client—and data enforcement can be respected by each IM router via the data compliance policies.

Figure 1:
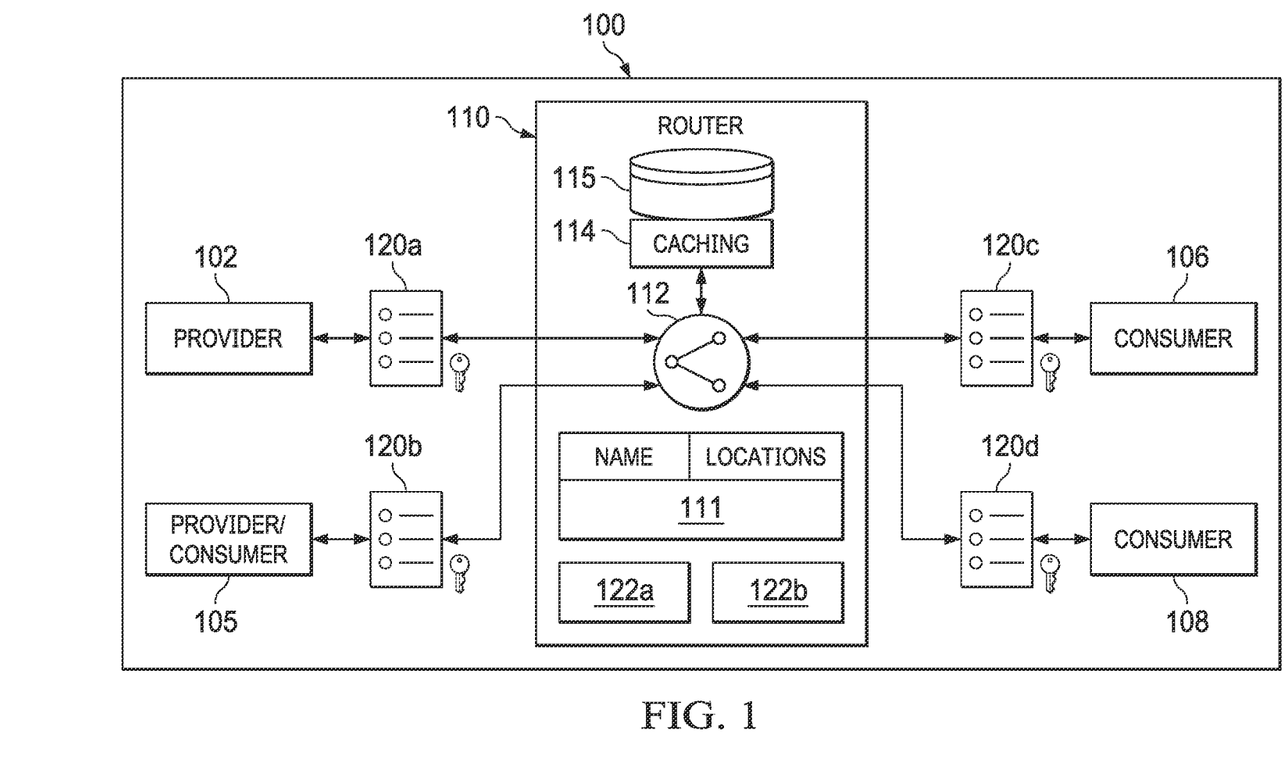
FIG. 1 is a diagrammatic representation of one embodiment of a simplified identity management topology.

FIG. 1 is a block diagram of one embodiment of an IM topology for a region 100 subject to respective data protection requirements. For example, region 100 may correspond to an EMEA GDPR region. The topology may include any number of IM instances (for example, instances of an IM application) that connect to IM router 110. Some or all of the IM instances may be at different domains and network addresses than each other. An IM instance may act as an IM provider, an IM consumer, or both. In the illustrated embodiment, IM instance 102 and IM instance 105 act as IM providers and IM instance 105, IM instance 106 and IM instance 108 act as IM consumers. Each IM instance is configured with a unique name and a list of areas (e.g., geographic areas) of data compliance. For example, an IM instance in the UK may be associated with an EMEA GDPR and UK areas of data compliance. Each IM instance is configured to register with an IM router 110.

IM router 110 allows IM consumers and IM providers to communicate via an identity management protocol to facilitate, for example, sharing of applications, accounts, identities, roles or other IM artifacts with a simplified topology—such as a star topology (hub)—that can adhere to data protection requirements and regulatory compliancy. According to one embodiment, IM router 110 is a SCIM router that allows IM consumers and IM providers to communicate via the SCIM protocol.

In the illustrated embodiment, IM router 110 includes an access control agent instance 112 and a caching agent instance 114. Access control agent instance 112 enforces data protection requirements according to a set of data compliance (DC) policies (e.g., DC policies 120a, DC policies 120b, DC policies 120c, DC policies 120d) and routes identity management data to a caching agent instance 114 according to object policies (e.g., object policies 122a, 122b). Caching agent instance 114 caches IM objects in a cache 115 and responds to queries for cached identify data from access control agent instance 112.

IM router 110 provides an interface (e.g., a ReST interface) to allow IM instances to register with IM router 110. Each IM instance 102, 105, 106, 108 registers with IM router 110 with a unique name and uploads a list of the areas of data compliance to which the instance belongs. IM router 110 thus maintains a register 111 (e.g., a list or other data structure) of registered instances containing, for example, the unique name and the list the areas of data compliance for each registered instance. In some embodiments, the IM instance may also upload or manage DC policies and object policies applicable to that instance.

Each IM provider (e.g., IM instance 102, IM instance 105) allows identity management data, such as identity metadata, account metadata, role metadata, entitlement metadata and application metadata to be queried through the IM router 110 according to the DC policies. For example, each IM provider can allow IM objects or attributes therein to be queried through IM router 110. In one embodiment, the queries are path based queries (e.g., for example, the queries are directed to https//:{routerURL}/{im_instance_name}, where routerURL is the URL of router 110 and im_instance_name is the IM instance to which the query is directed). DC policies may be associated with IM providers to control which of the IM provider's data an IM consumer can access. For example, DC policies 120a may include policies that govern which data of IM instance 102 the IM consumers can consume. DC policies may also be associated with IM consumers to provide additional filtering of what identity management data the consumers can consume. For example, DC policies 120c may provide additional policies governing which data IM instance 106 can consume.

According to one embodiment, DC policies and object policies are defined at IM router 110 but are owned by respective providers (or consumers). For example, IM instance 102 may have its own set of DC policies for one or more areas of data compliance or its own set of object policies and IM instance 105 may have a potentially different set of DC policies for the one or more areas of data compliance and a different set of object policies. Thus, the DC policies applied to the identity management data provided by an IM provider may be specific to the IM provider which provides that identity management data or the IM consumer to which the identity management data is to be provided. Similarly, the object policies applied to the identity management data provided by an IM provider may be specific to the IM provider which provides that identity management data or the IM consumer to which the identity management data is to be provided. In addition, or in the alternative, IM router may be configured with policies (e.g., DC policies for areas of data compliance or object policies) where the policies are not specific to an IM provider or IM consumer. For example, IM router 110 may be configured with DC policies for areas of data compliance, where a DC policy for an area of data compliance applies to any IM consumer associated with that area of data compliance, applies to any IM provider associated with that area of data compliance, or applies to any IM provider and any IM consumer associated with that area of data compliance.

A DC policy comprises a policy name and a set of permissions. The permissions may be set, for example, on the IM object level. In addition, or in the alternative, permissions may be set on individual attributes within an IM object. Moreover, in some embodiments, permissions for different types of access may be set on the IM object level or attribute level. Examples of permissions include, but are not limited to, provisioning permissions and read-only permissions. For example, a compliance policy may set the permission "resourceType": "account", provision:no, meaning that account objects cannot be provisioned (accessed by IM consumers) according to the DC policy. An IM object or attribute for which provisioning is allowed may be accessed and written to by the IM consumers according to the DC policy (that is, an IM consumer may update the object). An object or attribute that is marked as read-only may be read but not overwritten by IM consumers according to the DC policy. In some cases, an IM object can be marked for provisioning, which allows write access, but one or more attributes in the object can be marked read-only such that the attributes cannot be overwritten by IM consumers according to the DC policy. In some embodiments, permissions may be set at the individual attributes within the IM object level. According to one embodiment, DC policies are a hierarchical list of DC policies which can be assigned to IM instances registered with IM router 110.

Figure 2:
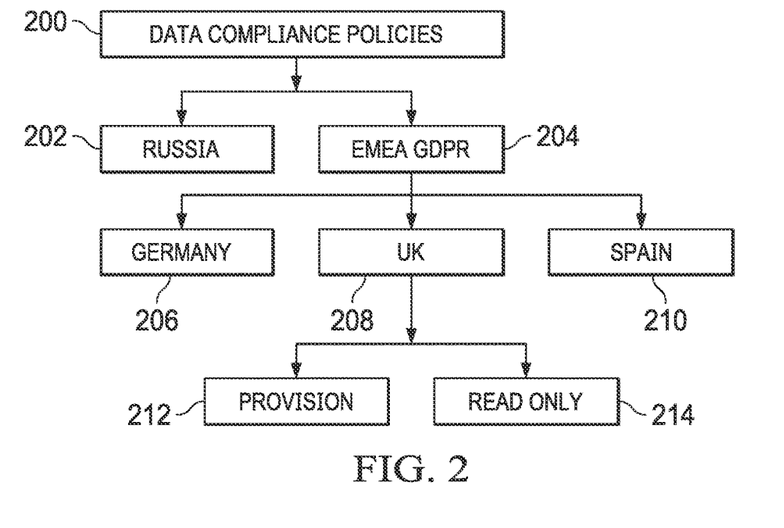
FIG. 2 is a diagrammatic representation of one embodiment of a set of data compliance policies.

Turning briefly to FIG. 2, this figure illustrates one embodiment of a hierarchy of DC policies 200. In the illustrated embodiment, each DC policy is associated with an area of data compliance. DC policies 200 includes a Russia DC compliance policy 202 and a Europe Middle East Asia (EMEA) GDPR DC policy 204. EMEA GDPR DC policy 204 includes a Germany DC policy 206, a UK DC policy 208 and a Spain DC policy 210. The UK DC policy 208 includes a provision compliance policy 212 and a read only compliance policy 214. UK provision compliance policy 212 dictates, for example, which objects (or individual attributes) can be accessed and overwritten by IM consumers associated with the UK data compliance area. UK read-only compliance policy 214 specifies objects or attributes that are read-only and can be accessed, but not overwritten by IM consumers associated with the UK data compliance area. Applying the EMEA GDPR/UK DC policy 208 means that the EMEA GDPR/UK/Provision compliance policy 212 and the EMEA GDPR/UK/Read Only compliance policy 214 are applied. According to one embodiment, inheritance dictates that policies which are promoted above sub-ordinate policies are automatically applied. Thus, applying the UK DC policy 20 means that the EMEA GDPR DC policy 204 is also applied.

Returning to FIG. 1, all objects which are shared from IM provider instances classify the identity management data they are sharing. For example, various types of objects (e.g., resource types) and attributes in those object types are defined. Thus, as discussed above, permissions can be applied at the object level or the individual attribute level. As will be appreciated, various rules may be implemented at IM router 110 to apply policies to various types of identity management data. To provide a nonlimiting example, one or more data compliance policies may be assigned to roles; one or more data compliance policies may be assigned to applications; entitlements automatically assume the same data compliance policies as application, but can be overridden; account attributes automatically assume the same data compliance policies as applications, but can be overridden; identities automatically assume the same data compliance policies as a provider instance, but can be overridden.

IM router 110 can employ a cache designed to persist IM objects (e.g., based on their TTL (time to live) setting) and allow for queries to be answered with minimum overhead of the IM provider instances. Object policies (e.g., object policy 122a, object policy 122b) specify the objects to be cached and a lifecycle for the cached objects, for example how long objects are to be cached (e.g., time to live (TTL)). According to one embodiment, object policies can be defined on a per-IM provider basis.

As one example, an object policy may be established to cache identities (identity objects) provided by an IM provider. The object policy may specify a TTL for the identities and any criteria to filter the identities to be cached. As another example, an object policy may be established to cache objects by application. For example, an object policy for an IM provider may specify to cache entitlements for an application, including a TTL setting for the entitlements and any filter criteria to filter which entitlements are cached. As another example, an object policy for an IM provider may specify to cache accounts for an application, including a TTL setting for the accounts and any filter criteria to filter which accounts are cached. There may be any number of object policies for the various object types. In some embodiments, IM router 110 may request an IM object from an IM provider to update the cache when the lifecycle of a cached IM object has ended. In addition, or in the alternative, IM providers may push IM objects to IM router 110 for caching.

IM router 110 may be implemented according to a variety of architectures. According to one embodiment, IM router 110 is implemented as a set of Java-based micro-services to route and cache identity management traffic (e.g., SCIM traffic) between providers and consumers to facilitate multiple client or server instances. An event bus architecture may be used in which requests from IM consumers and responses from IM providers are added to an access control agent event bus to be picked up by the access control agent instance 112. Similarly, queries to the cache and requests to cache identity management data may be added to a caching agent event bus to be picked up by the caching agent instance 114.

Figure 3:
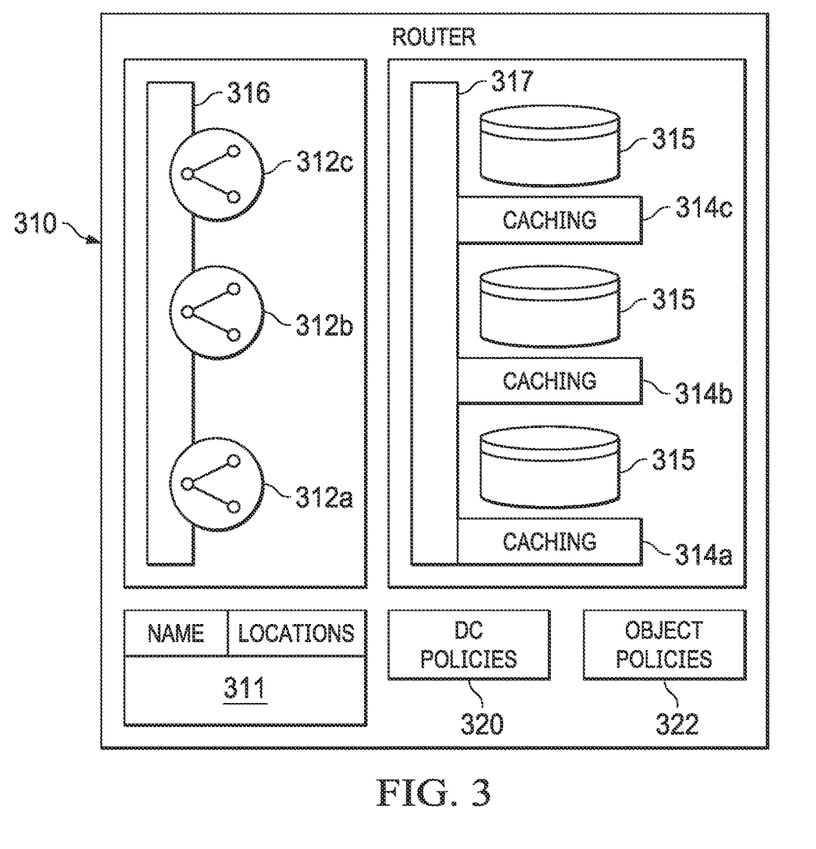
FIG. 3 is a diagrammatic representation of one embodiment of scaling of an identity management router.

An event bus architecture may promote scalability. For example, FIG. 3 is a diagrammatic representation of one embodiment of an IM router 310 comprising a register 311 of IM instances (IM consumers, IM providers), an access control agent instance 312a, an access control agent instance 312b, an access control agent instance 312c, a caching agent instance 314a, a caching agent instance 314b, a caching agent instance 314c, DC policies 320 and object policies 322. In general, IM router 310 may operate similarly as discussed above with respect to IM router 110.

Each access control agent instance enforces data protection requirements according to DC policies 320 and routes identity management data for caching according to object policies 322. Each caching agent instance caches identity management objects in a database 315 and responds to queries for cached identity management data. In one embodiment, the caching agent instances share a database. In another embodiment, a distributed NoSQL database which scales by duplicating required data across its nodes can be used to offer high throughput. Other database or storage technologies may also be used for the cache. The access control agent instances may each consume events from a common access control agent event bus 316 and the caching agent instances may each consume events from a common caching agent event bus 317. As will be appreciated, access control agent instances and caching agent instances can be easily added or removed from IM router 310 as needed. For example, access control agent instances may scale elastically, leveraging non-blocking API's and event bus technology and cache agent instances may scale elastically using various database technologies, such as Apache Cassandra in one embodiment (Cassandra is a trademark of The Apache Software Foundation Corporation Delaware, all trademarks or tradenames used herein are the property of their respective owners). Other architectures may also be used.

Figure 4:
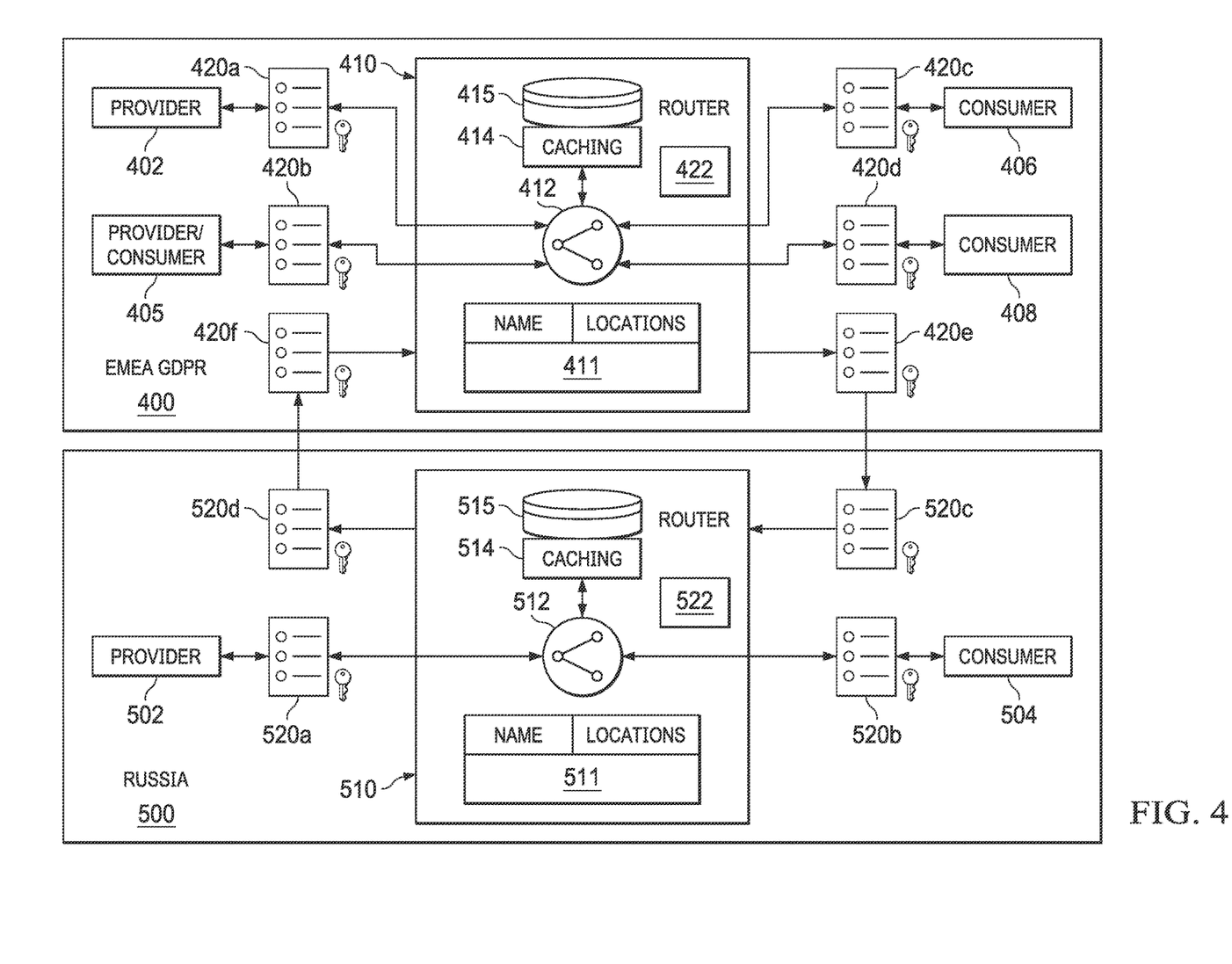
FIG. 4 is a diagrammatic representation of one embodiment of identity management router chaining.

FIG. 4 is a block diagram of one embodiment of an IM topology for routing of identity management data across regions that have different data protection requirements. In the illustrated embodiment, region 400 corresponds to an EMEA region subject to GDPR and region 500 corresponds to Russia.

The topology of a region may include any number of IM instances (for example, instances of an IM application) that connect to an IM router 410, 510 in that region. An IM instance may act as an IM provider, an IM consumer, or both. In the illustrated embodiment, IM instances 402, 405, 406 and 408 connect to IM router 410 and IM instances 502 and 504 connect to IM router 510. IM instance 402, IM instance 405 and IM instance 502 act as IM providers and IM instance 405, IM instance 406, IM instance 408 and IM instance 504 act as IM consumers. Each IM instance is configured with a unique name and a list of areas (e.g., geographic regions) of data compliance. Further, each IM instance is configured to allow the IM instance to register with the respective IM router 410, 510.

IM routers 410, 510 allow IM consumers and IM providers to communicate via an identity management protocol to facilitate, for example, sharing of applications, accounts, identities, roles or other IM artifacts with a simplified topology—such as a star topology (hub)—that can adhere to data protection requirements and regulatory compliancy. According to one embodiment, each of IM router 410 and IM router 510 is a SCIM router that allows IM consumers and IM providers to communicate via a SCIM protocol.

IM router 410 includes an access control agent instance 412 and a caching agent instance 414. Access control agent instance 412 enforces data protection requirements according to a set of data compliance (DC) policies (e.g., DC policies 420a, DC policies 420b, DC policies 420c, DC policies 420d, DC policies 420e, DC policies 420f) and routes identity management data to a caching agent instance 414 according to object policies (e.g., object policies 422). Caching agent instance 414 caches identity management objects in a database 415 and responds to queries for cached identity management data from access control agent instance 412. Similarly, IM router 510 includes an access control agent instance 512 and a caching agent instance 514. Access control agent instance 512 enforces data protection requirements according to a set of data compliance (DC) policies (e.g., DC policies 520a, DC policies 520b, DC policies 520c, DC policies 520d) and routes identity management data to a caching agent instance 514 according to object policies (e.g., object policies 522). Caching agent instance 514 caches identity management objects in cache 515 and responds to queries for cached identity management data from access control agent instance 512. IM router 410 and IM router 410 may be scalable to add or remove access control agent instances and caching agent instances as needed.

Each of IM router 410 and IM router 510 provides an interface (e.g., a ReST interface) to allow IM instances to register with the router. For example, each IM instances 402, 405, 406, 408 registers with IM router 410 with a unique name and uploads a list of the areas of data compliance to which the instance belongs. IM router 410 thus maintains a register 411 of registered instances containing, for example, the unique name and the list of the areas of data compliance for each registered instance. Each IM instance 502, 504 registers with IM router 510 with a unique name and uploads a list of the areas of data compliance to which the instance belongs. IM router 510 thus maintains a register 511 of registered instances containing, for example, the unique name and the list of the areas of data compliance for each registered instance. In some embodiments, the IM instance may also upload or manage DC policies and object policies applicable to that instance.

Figure 5:
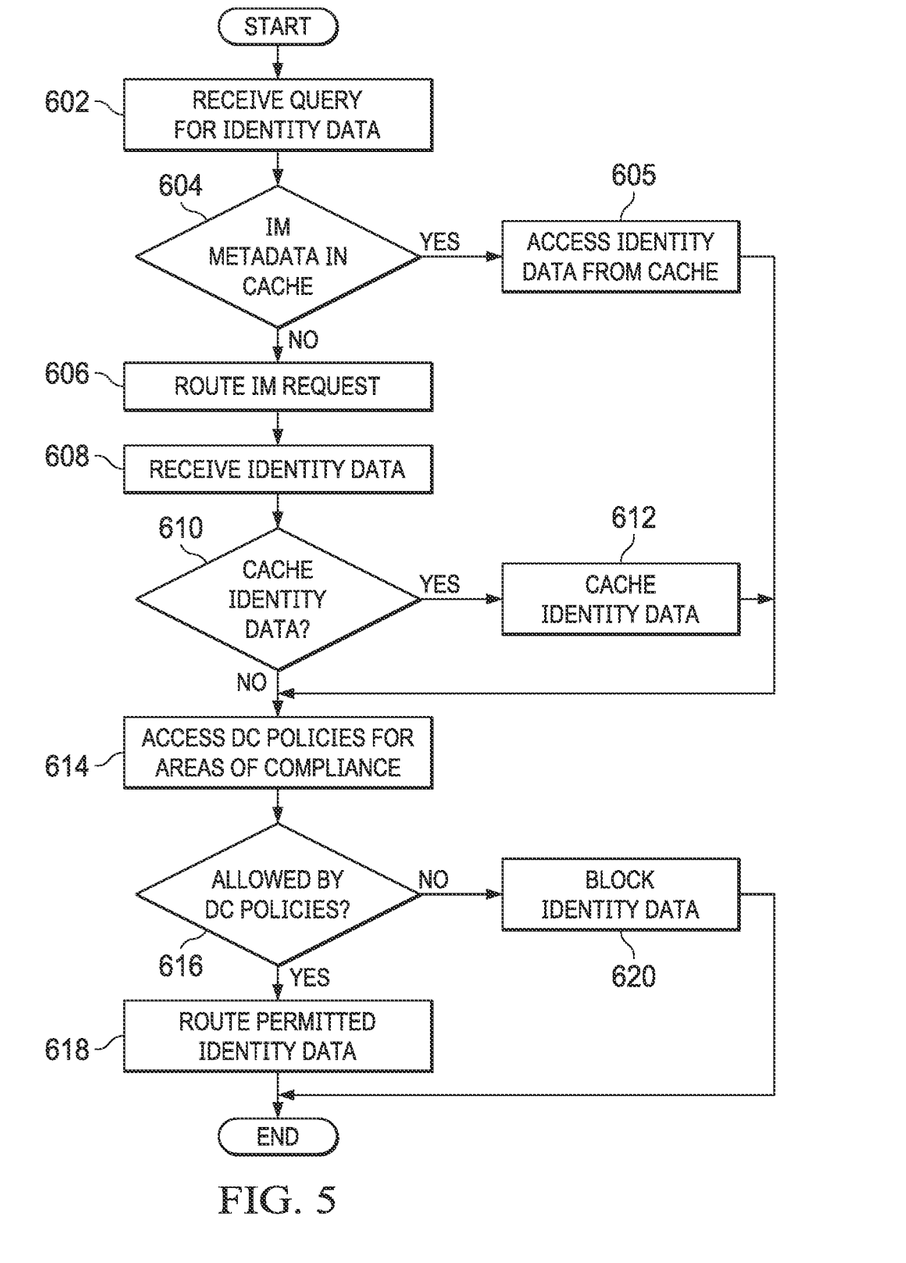
FIG. 5 is a flow chart illustrating one embodiment of a method for identity management routing.

In the embodiment of FIG. 5, IM router 410 and IM router 510 are chained together. In such an embodiment, IM router 410 is configured to route requests to IM providers in region 500 to IM router 510 and IM router 510 is configured to route requests to IM providers in region 400 to IM router 410. In one embodiment, IM router 410 may register with IM router 510 using, for example, region 400 as its area of data compliance and IM router 510 may register with IM router 410 using, for example, region 500 as its area of data compliance. In some implementations, IM router 410 may provide register data for the registered IM instances in region 400 to IM router 510 and IM router 510 may provide register data for the registered IM instances in region 500 to IM router 410. Thus, register 411 may include information for IM instances in region 500 and register 511 may include information for IM instances in region 400. Thus, for example, if IM router 410 receives a query directed to the https://routerurl2/instance_502, where routerurl2 is the URL of IM router 510, IM router 410 can route the request to IM router 510. In any event, when IM router receives a request for identity management data from region 500, IM router can route the request to IM router 510 and, when IM router 510 receives a request for identity management data from region 400, IM router can route the request to IM router 410.

Each IM provider allows identity management data, such as identity metadata, account metadata, role metadata, entitlement metadata and application metadata, to be queried through the respective IM router according to the DC policies. For example, each IM provider can allow IM objects or attributes therein, for example, SCIM objects or attributes therein, to be queried through the respective IM router. In the illustrated embodiment, IM router 410 is configured with DC policies 420a, 420b, 420c, 420d, 420e, 420f and IM router 510 is configured with DC policies 520a, 520b, 520c and 520d. DC policies may be associated with IM providers to control which of the IM provider's data an IM consumer can access. For example, DC policies 420a may include policies that govern which data of IM instance 402 the IM consumers can consume. DC policies may also be associated with IM consumers to provide additional filtering of what identity management data the consumers can consume. For example, DC policies 420c may provide additional policies governing which data IM instance 406 can consume. According to one embodiment, DC policies and object policies are defined at an IM router but are owned by respective providers (or consumers).

DC policies can be established to govern routing between chained routers. For example, DC policy 420e may be a Russia DC policy that applies to routing identity management data to region 500 and DC policy 520d may be an EMEA GDPR DC policy that applies to routing identity management data to region 400. In some embodiments, an IM router may also be configured with a DC policy that applies to receiving identity management data from another region. For example, DC policy 420f may be a Russia DC policy that IM router 410 applies to identity management data received from region 500 and DC policy 520c may be a Russia DC policy that IM router 510 applies to identity management data received from region 400.

In some embodiments, the object policies of an IM router may specify which identity objects received from a chained router to cache. For example, object policies 422 may include a policy for caching objects received by IM router 410 from IM router 510 and object policies 522 may include a policy for caching objects received by IM router 510 from IM router 410.

Figure 6:
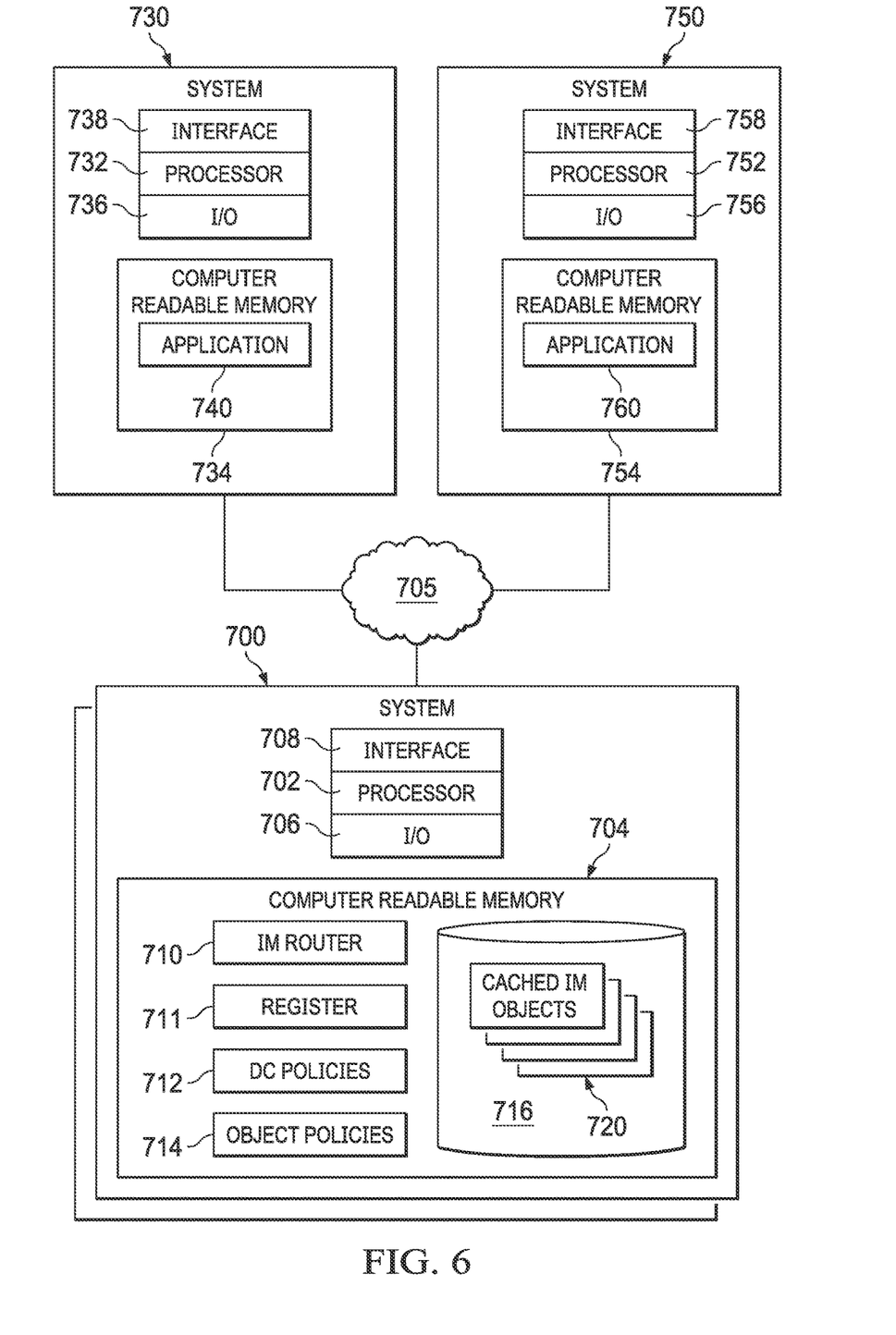
FIG. 6 is a diagrammatic representation of one embodiment of a distributed network environment.

FIG. 6 is a flow chart illustrating one embodiment of a method for IM routing that may be implemented by an IM router, such as IM router 110, IM router 310, IM router 410, IM router 510. At step 602, the IM router receives an IM request for identity management data from an IM consumer. For example, the IM router may receive a request including a SCIM query for a SCIM object or an attribute within a SCIM object. In some cases, the IM request may have been routed to the IM router by a chained router. The request may include the IM consumer's unique name and the unique name of an IM provider to which the request is directed. The request may also include the location of the IM consumer or the location of the IM provider (or the locations may be obtained from the register of the IM router). At step 604, the IM router queries its cache to determine if the requested identity management data is available from cache. For example, the IM router may determine if an IM object is available from cache (e.g., is in cache and not stale) (step 604). If the requested identity management data is available from cache, the IM router accesses the requested identity management data from cache (step 605). In some embodiments, the IM router does not check its cache if the IM request is to be routed to another IM router.

At step 606, the IM router routes the IM request. For example, the IM router may route a SCIM query directly to the appropriate IM provider. On the other hand, if the IM provider is in another region, the IM router may route the IM request to the IM provider by routing the IM request to a chained IM router for that region for routing to the IM provider. The chained IM router may process the request (e.g., beginning at step 602). At step 608, the IM router receives identity management data responsive to the request. For example, the IM router receives a SCIM response to a SCIM request. The IM router accesses the object policies associated with the IM provider to determine whether to cache the identity management data (step 610). If the identity management data is to be cached according to the object policies, the IM router caches the identity management data. For example, the IM router may cache an IM object returned by the IM provider (step 612).

At step 614, the IM router evaluates the DC policies to determine which of the requested identity management data, if any, to route to the IM consumer. For example, the IM router may evaluate DC policies (e.g., DC policies associated with the IM provider) based on the location of the IM consumer to determine whether to send the requested identity management data to the requesting IM consumer. In addition, or in the alternative, the IM router may evaluate DC policies associated with the IM consumer to determine whether to send the requested identity management data to the requesting IM consumer (step 616). If the identity management data can be provisioned according to the DC policies, the IM router may route the identity management data (step 618). For example, the IM router may route an IM object directly to the appropriate IM consumer. If the IM consumer is in another region, the IM router may route the identity management data to a chained IM router for that region for routing to the IM consumer. The chained IM router may further process the IM response (beginning, for example, at step 608). If the identity management data cannot be provisioned according to the applicable DC policies, the IM router blocks the identity management data from being routed to the IM consumer (step 620). For example, the IM router may block an IM object or attribute of the IM object from being routed to the IM consumer. In some embodiments, the IM router returns an error or other indication that the identity management data could not be returned to the IM consumer.

As noted above, in some embodiments DC policies may specify permissions on an attribute basis. If only some of an object's attributes can be provisioned to the IM consumer based on the DC policies, the IM router may filter out those attributes that are prohibited before routing the filtered object—that is, a IM object of which a portion of the attribute values have been filtered out by the IM provider or IM router—to the IM consumer or chained IM router.

Using the topology of FIG. 1 as an example, assume IM instance 106 requests identity management data from IM instance 102, IM instance 106 is in the UK—that is, has the UK listed as a data compliance region in register 111 or otherwise indicates that its location is in the UK—and DC policies 120a comprise the DC policies of FIG. 2. In such an example, IM router 110 receives the IM request for identity management data (e.g., a SCIM request) (step 602) and determines if the requested identity management data is available from cache (step 604). If the requested identity management data is available from cache 115, IM router 110 accesses the requested identity management data from cache (step 605). If the requested identity management data is not available from cache 115, IM router 110 routes the request to IM instance 102 (step 606). On receiving the response to the IM request from IM instance 102 (step 608), IM router 110 accesses the object policies 122a associated with IM instance 102 to determine whether to cache the identity management data (step 610). If the identity management data is to be cached according to object policies 122a, IM router 110 caches the identity management data. For example, IM router 110 may cache an IM object returned by the IM instance 102 (step 612).

At step 614, IM router 110 evaluates the DC policies 120a associated with IM instance 102a based on the location of IM instance 106 to determine whether to router the requested identity management data to IM instance 106. For example, IM router 110 applies the EMEA GDPR/UK/Provision and EMEA GDPR/UK/Read Only DC policies to determine whether to forward the requested identity management data. In some embodiments, the EMEA GDPR/UK/Provision and EMEA GDPR/UK/Read Only DC policies may inherit permissions from the UK DC policy and the EMEA GDPR DC policies. In addition, or in the alternative, IM router 110 may evaluate DC policies 120c associated with the IM instance 106 to determine whether to send the requested identity management data to the requesting IM consumer (step 616). If the identity management data can be provisioned to IM instance 106 based on the DC policies, IM router 110 routes the identity management data directly to IM instance 106 responsive to the request, either from cache or returned by IM instance 102 (step 618). For example, IM router 110 may route a requested IM object or attribute of the IM object to IM instance 106 without going through another IM router. For example, IM router 110 may communicate the identity management data to IM instance 106 using a point-to-point SCIM communication in one embodiment. If only some of an object's attributes can be provisioned to IM instance 106 based on the DC policies 120a or DC policies 120c, IM router 110 may filter out those attributes that are prohibited before routing the filtered object to the IM instance 106. If the identity management data cannot be provisioned according to the DC policies applied, IM router 110 does not route the requested identity management data to the requesting IM consumer.

Using the topology of FIG. 4 as an example, assume IM instance 406 requests identity management data from IM instance 502, IM instance 406 is in the UK—that is, has the UK listed as a data compliance region in register 411 or otherwise indicates that its location is in the UK—DC policies 520a comprise the DC policies of FIG. 2. In such an example, IM router 410 receives the IM request for identity management data (e.g., a SCIM request) (step 602) and determines that the request is to an IM provider in the Russia region 500. In some embodiments, IM router 410 determines if the requested identity management data is available from cache (step 604). If the requested identity is available from cache 415, IM router 410 accesses the requested identity management data from cache (step 605) and processing proceeds to step 614 without routing the IM request. In other embodiments, IM router does not cache identity management data received from chained IM routers and thus does not check its cache for identity management data requested from other regions. At step 606, IM router 410 routes the IM request to IM router 510 (step 606).

IM router 510 receives the IM request for identity management data (e.g., a SCIM request) (step 602) and determines if the requested identity management data is available from cache (step 604). If the requested identity management data is available from cache 515, IM router 510 accesses the requested identity management data from cache 515 (step 605). If the requested identity management data is not available from cache 515, IM router 510 routes the request to IM instance 502 (step 606). On receiving the response to the IM request from IM instance 502 (step 608), IM router 510 accesses the object policies 522 to determine whether to cache the identity management data (step 610). If the identity management data is to be cached according to object policies 522, IM router 510 caches the identity management data. For example, IM router 510 may cache an IM object returned by the IM instance 502 (step 612).

At step 614, IM router 510 evaluates the DC policies 520a associated with IM instance 502a based on the locations of IM router 410 and/or IM instance 406 to determine whether to route the requested identity management data to IM instance 406 (step 616). For example, IM router 510 may apply EMEA GDPR, and EMEA GDPR/UK/Provision and EMEA GDPR/UK/Read Only DC policies to determine whether to route the requested identity management data to the IM router 410. In some embodiments, the EMEA GDPR/UK/Provision and EMEA GDPR/UK/Read Only DC policies may inherit permissions from the UK DC policy and the EMEA GDPR DC policies. In addition, or in the alternative, IM router 510 may evaluate DC policies 520d associated with region 400 or IM router 410 to determine whether to send the requested identity management data to the requesting IM router. If the identity management data can be provisioned based on the DC policies, IM router 510 routes the identity management data to IM instance 406 via IM router 410 (step 618). For example, IM router 510 may route a requested IM object or attribute of the IM object to IM router 410. Otherwise, IM router 510 does not route the requested identity management data to IM router 410. If only some of an object's attributes can be provisioned based on the DC policies applied by IM router 510, IM router 510 may filter out those attributes that are prohibited before routing the filtered IM object to the IM router 410.

Returning to IM router 410, IM router 410 receives the identity management data responsive to the IM request from IM router 510 (step 608). For example, IM router receives a SCIM response to a SCIM request. In some embodiments, IM routers may be configured such that all appropriate DC policies are applied at the IM router in the region of the IM provider. In such an embodiment, IM router 410 may simply route the identity management data received from IM router 510 to IM instance 406. In another embodiment, an IM router may be configured to apply various policies to identity management data received from a chained IM router.

According to one embodiment then, IM router 410 accesses the object policies 422 to determine whether to cache the identity management data (step 610). If the identity management data is to be cached according to object policies 422, IM router 410 caches the identity management data. For example, IM router 410 may cache an IM object routed from IM instance 502 by IM router 510 (step 612). In other embodiments, IM routers are configured not to cache identity management data received from chained IM routers.

At step 614, IM router 410 may access DC policies. For example, IM router 410 may access DC policies associated with region 500 or IM router 510 (e.g., DC policies 420f and DC policies 420c). If DC policies 420f or DC policies 420c include a DC policy applicable to the EMEA GDPR or EMEA GDPR/UK, IM router 410 applies those policies to the IM response. If the identity management data can be provisioned based on the DC policies, IM router 410 routes the identity management data to IM instance 406. For example, IM router 410 may route a requested IM object or attribute of the IM object to IM instance 406. Otherwise, IM router 410 does not route the requested identity management data to IM instance 106. If only some of an IM object's attributes can be provisioned based on the DC policies applied by IM router 410, IM router 410 may filter out those attributes that are prohibited before routing the filtered IM object to the IM instance 406.

FIG. 5 is provided by way of example and not limitation. Various steps may be repeated, steps may be performed in different orders, steps omitted, and additional or alternative steps performed.

In some embodiments, an IM router checks the DC policies associated with the IM provider or IM consumer prior to routing an IM request. For example, IM router 110 may check DC policies 120a and DC policies 120c prior to routing an IM request from IM instance 106 to IM instance 102. As another example, IM router 410 may check DC policies 420c and DC policies 420f prior to routing a request to IM router 510 to ensure that the requested data can be provisioned to IM instance 106 and IM router 510 can check DC policies 520d and DC policies 520a prior to routing a request from region 400 to IM instance 502. If the requested identity management data cannot be provisioned to the IM consumer based on the DC policies, the IM router does not route the IM request.

Thus, in some embodiments, an IM router only forwards a request for identity management data to an IM provider if the DC policies allow the identity management data to be returned to the IM consumer. While such an embodiment may have the effect of reducing the number of requests sent to IM providers or across region regions, it may also slow how quickly objects are added to the IM router's cache, thus potentially reducing overall topology performance.

Embodiments of the technology may be implemented on a computing system. Any combination of mobile desktop, server, embedded or other types of hardware may be used. FIG. 6 is a diagrammatic representation of one embodiment of a distributed network computing environment where embodiments disclosed herein can be implemented. The computing environment includes an IM router system 700, a computer system 730 and a computer system 750 connected to a network 705 (e.g., a local area network (LAN), a wide area network (WAN) such as the Internet, mobile network, or other type of network or combination thereof). Network 705 may represent a combination of wired and wireless networks that network computing environment may utilize for various types of network communications.

IM router system 700 may include, for example, a computer processor 702 and associated memory 704. Computer processor 702 may be an integrated circuit for processing instructions. For example, processor 702 may comprise one or more cores or micro-cores of a processor. Memory 704 may include volatile memory, non-volatile memory, semi-volatile memory, or a combination thereof. Memory 704, for example, may include RAM, ROM, flash memory, a hard disk drive, a solid-state drive, an optical storage medium (e.g., CD-ROM), or other computer readable memory or combination thereof. Memory 704 may implement a storage hierarchy that includes cache memory, primary memory, or secondary memory. In some embodiments, memory 704 may include storage space on a data storage array. IM router system 700 may also include input/output ("I/O") devices 706, such as a keyboard, monitor, printer, electronic pointing device (e.g., mouse, trackball, stylus, etc.), or the like. IM router system 700 may also include a communication interface 708, such as a network interface card, to interface with network 705.

Memory 704 may store instructions executable by processor 702. For example, memory 704 may include code 710 executable to implement an IM router, such as IM router 110, 310, 410, 510. IM router system 700 may be coupled to a data store that stores data usable by the IM router. The data store may comprise one or more databases, one or more file systems or a combination thereof. In some embodiments, the data may be a portion of memory 704. For example, memory 704 may be configured to a register 711 of IM instances, DC policies 712 and object policies 714. Memory 704 may further be configured to provide a cache 716 for identity management data. For example, cache 716 may be configured to store IM objects 720, such as SCIM objects. There may be multiple IM router systems 700 in a region and across regions.

Computer system 730 may include, for example, a computer processor 732 and associated memory 734. Computer processor 732 may be an integrated circuit for processing instructions. For example, processor 732 may comprise one or more cores or micro-cores of a processor. Memory 734 may include volatile memory, non-volatile memory, semi-volatile memory, or a combination thereof. Memory 734, for example, may include RAM, ROM, flash memory, a hard disk drive, a solid-state drive, an optical storage medium (e.g., CD-ROM), or other computer readable memory or combination thereof. Memory 734 may implement a storage hierarchy that includes cache memory, primary memory, or secondary memory. In some embodiments, memory 734 may include storage space on a data storage array. Computer system 730 may also include I/O devices 736 and a communication interface 738, such as a network interface card, to interface with network 705. Memory 734 may store instructions executable by processor 732. For example, memory 734 may include an application 740 that acts as an IM consumer. There may be multiple computer systems in a topology that provide IM consumers.

Computer system 750 may include, for example, a computer processor 752 and associated memory 754. Computer processor 752 may be an integrated circuit for processing instructions. For example, processor 752 may comprise one or more cores or micro-cores of a processor. Memory 754 may include volatile memory, non-volatile memory, semi-volatile memory, or a combination thereof. Memory 754, for example, may include RAM, ROM, flash memory, a hard disk drive, a solid-state drive, an optical storage medium (e.g., CD-ROM), or other computer readable memory or combination thereof. Memory 754 may implement a storage hierarchy that includes cache memory, primary memory, or secondary memory. In some embodiments, memory 754 may include storage space on a data storage array. Computer system 750 may also include I/O devices 756 and a communication interface 758, such as a network interface card, to interface with network 705. Memory 754 may store instructions executable by processor 752. For example, memory 754 may include an application 760 that acts as an IM provider. There may be multiple computer systems in a topology that provide IM providers.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods, or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An identity management (IM) router comprising:
   a memory configured to store a register of IM instances associated with areas of data compliance and a set of data compliance policies for the areas of data compliance, the set of data compliance policies comprising a hierarchy of data compliance policies representing relationships between the areas of data compliance;
   a processor;
   a non-transitory, computer-readable storage medium, including computer instructions for:
      receiving, over a network, an IM request according to a system for cross-domain identity management (SCIM) protocol, the IM request issued by an IM consumer for identity management data from an IM provider specified by the IM consumer;
      routing the IM request according to the SCIM protocol over the network to the IM request according to the SCIM protocol over the network to the IM provider specified by the IM consumer and receiving the identity management data from the IM provider in an IM response according to the SCIM protocol;
      determining from the register a first area of data compliance associated with the IM consumer;
      accessing a data compliance policy for the first area of data compliance;
      evaluating the data compliance policy for the first area of data compliance to determine whether the identity management data is permitted to be provisioned to the first area of data compliance, wherein evaluating the data compliance policy for the first area of data compliance comprises evaluating a superordinate data compliance policy from the hierarchy of data compliance policies, the superordinate data compliance policy corresponding to a second area of data compliance of which the first area of data compliance is a sub-area;
      based on a determination from evaluating the data compliance policy for the first area of data compliance that the identity management data is permitted to be provisioned, routing the identity management data to the IM consumer according to the SCIM protocol; and
      based on a determination from evaluating the data compliance policy for the first area of data compliance that the identity management data is not permitted to be provisioned, not routing the identity management data to the IM consumer.

2. The IM router of claim 1, wherein the IM router allows communication between a plurality of IM instances using the SCIM protocol according to a star topology.

3. The IM router of claim 1, wherein the data compliance policy for the first area of data compliance comprises provisioning permissions selected to enforce a set of local data protection requirements.

4. The IM router of claim 1, wherein routing the identity management data to the IM consumer further comprises routing the identity management data directly to the IM consumer.

5. The IM router of claim 1, wherein the IM provider and the IM consumer are in a same defined geographic region subject to a set of local data protection requirements and wherein the IM router is configured to enforce the set of local data protection requirements.

6. The IM router of claim 1, wherein the IM consumer is in a first region subject a first set of local data protection requirements and the IM provider is in a second region subject to a second set of local data protection requirements, wherein receiving the IM request comprises receiving the IM request from a chained IM router in the first region, and wherein routing the identity management data to the IM consumer comprises routing the identity management data to the chained IM router for routing to the IM consumer.

7. The IM router of claim 1, wherein the data compliance policy for the first area of data compliance is associated with the IM provider.

8. The IM router of claim 1, wherein the memory is configured to provide an IM object cache and wherein the non-transitory, computer-readable storage medium includes computer instructions for:
   based on the IM request, querying the IM object cache for the identity management data;
   based on a determination that the identity management data is available from the IM object cache, obtaining the identity management data from the IM object cache to return to the IM consumer responsive to the IM request; and
   based on a determination that the identity management data is not available from the IM object cache, routing the IM request to the IM provider and receiving the identity management data from the IM provider responsive to the IM request.

9. The IM router of claim 1, wherein the non-transitory, computer readable medium comprises computer instructions for receiving the IM request from the IM consumer as a path-based query directed to a uniform resource locator (URL) that identifies the IM provider.

10. The IM router of claim 1, wherein the non-transitory, computer readable medium comprises computer instructions for providing an interface to allow new IM instances to automatically register with the IM router and indicate corresponding areas of data compliance to the IM router.

11. A non-transitory, computer-readable storage medium, embodying thereon computer instructions for an identity management (IM) router for routing a system for cross-domain identity management (SCIM) protocol, the computer instructions for the IM router comprising instructions executable by a processor for:
   storing in a memory a register of IM instances associated with areas of data compliance and a set of data compliance policies for the areas of data compliance, the set of data compliance policies comprising a hierarchy of data compliance policies representing relationships between the areas of data compliance;

receiving, over a network, an IM request according to the SCIM protocol, the IM request issued by an IM consumer for identity management data from an IM provider specified by the IM consumer;

routing the IM request according to the SCIM protocol over the network to the IM provider specified by the IM consumer and receiving the identity management data from the IM provider in an IM response according to the SCIM protocol;

determining from the register that the IM consumer is associated with a first area of data compliance;

accessing a data compliance policy for the first area of data compliance from the memory;

evaluating the data compliance policy for the first area of data compliance to determine whether the identity management data is permitted to be provisioned to the first area of data compliance, wherein evaluating the data compliance policy for the first area of data compliance comprises evaluating a superordinate data compliance policy from the hierarchy of data compliance policies, the superordinate data compliance policy corresponding to a second area of data compliance of which the first area of data compliance is a sub-area;

based on a determination from evaluating the data compliance policy for the first area of data compliance that the identity management data is permitted to be provisioned, routing the identity management data to the IM consumer according to the SCIM protocol; and based on a determination from evaluating the data compliance policy for the first area of data compliance that the identity management data is not permitted to be provisioned, not routing the identity management data to the IM consumer.

12. The non-transitory, computer-readable storage medium of claim 11, wherein the computer instructions for the IM router comprise instructions to allow a plurality of IM instances to communicate using the SCIM protocol according to a star topology.

13. The non-transitory, computer-readable storage medium of claim 11, wherein the data compliance policy for the first area of data compliance comprises provisioning permissions selected to enforce a set of local data protection requirements.

14. The non-transitory, computer-readable storage medium of claim 11, wherein routing the identity management data to the IM consumer further comprises routing the identity management data directly to the IM consumer.

15. The non-transitory, computer-readable storage medium of claim 11, wherein the IM provider and the IM consumer are in a same defined geographic region subject to a set of local data protection requirements and wherein the IM router is configured to enforce the set of local data protection requirements.

16. The non-transitory, computer-readable storage medium of claim 11, wherein the IM consumer is in a first region subject a first set of local data protection requirements and the IM provider is in a second region subject to a second set of local data protection requirements, wherein receiving the IM request comprises receiving the IM request from a chained IM router in the first region, and wherein routing the identity management data to the IM consumer comprises routing the identity management data to the chained IM router for routing to the IM consumer.

17. The non-transitory, computer-readable storage medium of claim 11, wherein the data compliance policy for the first area of data compliance is associated with the IM provider.

18. The non-transitory, computer-readable storage medium of claim 11, wherein the computer instructions for the IM router comprise computer instructions for:
maintaining an IM object cache in the memory;
based on the IM request, querying the IM object cache for the identity management data;
based on a determination that the identity management data is available from the IM object cache, obtaining the identity management data from the IM object cache to return to the IM consumer responsive to the IM request; and
based on a determination that the identity management data is not available from the IM object cache, routing the IM request to the IM provider and receiving the identity management data from the IM provider responsive to the IM request.

19. The non-transitory, computer-readable storage medium of claim 11, further comprising computer instructions for receiving the IM request from the IM consumer as a path-based query directed to a uniform resource locator (URL) that identifies the IM provider.

20. The non-transitory, computer-readable storage medium of claim 11, further comprising computer instructions for providing an interface to allow new IM instances to automatically register with the IM router and indicate corresponding areas of data compliance to the IM router.

21. A method comprising:
providing an identity management (IM) router for routing a system for cross-domain identity management (SCIM) protocol;
storing in a memory a register of IM instances associated with areas of data compliance and a set of data compliance policies for the areas of data compliance, the set of data compliance policies comprising a hierarchy of data compliance policies that represents relationships between the areas of data compliance;
receiving, over a network, an IM request according to the SCIM protocol at the IM router, the IM request issued by an IM consumer for identity management data from an IM provider specified by the IM consumer;
routing the IM request according to the SCIM protocol over the network to the IM provider specified by the IM consumer and receiving the identity management data from the IM provider in an IM response according to the SCIM protocol;
determining from the register that the IM consumer is associated with a first area of data compliance;
accessing a data compliance policy for the first area of data compliance from the memory;
evaluating the data compliance policy for the first area of data compliance to determine whether the identity management data is permitted to be provisioned to the first area of data compliance, wherein evaluating the data compliance policy for the first area of data compliance comprises evaluating a superordinate data compliance policy from the hierarchy of data compliance policies, the superordinate data compliance policy corresponding to a second area of data compliance of which the first area of data compliance is a sub-area; and
based on a determination from evaluating the data compliance policy for the first area of data compliance that the identity management data is permitted to be provisioned, routing the identity management data to the IM consumer according to the SCIM protocol.

22. The method of claim 21, wherein the data compliance policy for the first area of data compliance comprises provisioning permissions selected to enforce a set of local data protection requirements.

23. The method of claim 21, further comprising allowing communication between a plurality of IM instances using the SCIM protocol according to a star topology.

24. The method of claim 21, further comprising receiving the IM request from the IM consumer as a path-based query directed to a uniform resource locator (URL) that identifies the IM provider.

* * * * *